W. A. IVES.
MANUFACTURE OF TWIST DRILLS
No. 182,446. Patented Sept. 19, 1876.
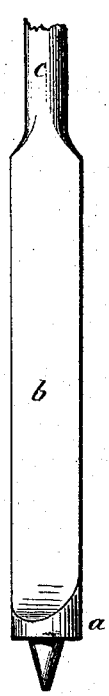
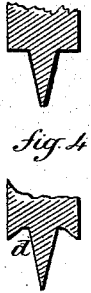

UNITED STATES PATENT OFFICE.

WILLIAM A. IVES, OF NEW HAVEN, CONNECTICUT, ASSIGNOR TO WILLIAM A. IVES & CO., OF SAME PLACE.

IMPROVEMENT IN MANUFACTURE OF TWIST-DRILLS.

Specification forming part of Letters Patent No. 182,446, dated September 19, 1876; application filed January 24, 1876.

*To all whom it may concern:*

Be it known that I, WILLIAM A. IVES, of New Haven, in the county of New Haven and State of Connecticut, have invented a new Improvement in the Manufacture of Auger-Bits; and I do hereby declare the following, when taken in connection with the accompanying drawings and the letters of reference marked thereon, to be a full, clear, and exact description of the same, and which said drawings constitute part of this specification, and represent, in—

Figure 1, the blank as forged preparatory to twisting; Fig. 2, the blank as twisted; Fig. 3, vertical section of the head of the blank; Figs. 4, 5, and 6, views illustrating the completion of the auger.

This invention relates to an improvement in twist-augers, and specially to such as are formed with solid heads.

The usual method for forming this class of augers has been to upset the end after twisting, to furnish sufficient metal to form the cutting end, and then swaged to shape.

The object of this invention is to avoid this upsetting; and it consists in the method of forming the cutting end of the auger, as hereinafter described.

A rod of the diameter of the auger is employed, and this is drawn down from the end $a$, to form the pod or flat blade $b$ the length required, and then rounded to still less diameter into the spindle $c$. In drawing from the end $a$ to the flat blade, the shoulder between the head and the blade is made concave, in substantially a spiral shape, as seen in Fig. 1. This leaves the head a solid cylindrical shape, and substantially such as seen in Fig. 3. The blade or pod is then twisted, as seen in Fig. 2; then, with a suitable mill, the point is formed, and at the same time an annular channel, $d$, around the point, so as to form nearly a sharp edge around the head, as seen in Fig. 4; then, with a mill corresponding to the twist of the auger, the twist is cut or continued through the solid head, as at $e$, Figs. 5 and 6; then, a portion of the rim or edge around the channel $d$ is cut away, and so as to leave the floor-lip $f$ and form the spur $h$ in rear of the said floor-lip, as seen in Fig. 6.

By this method the usual upsetting, swaging, and consequent "cold-shut" is avoided, and a perfect head and cutting end produced, and with less labor.

I claim—

The method herein described of manufacturing twist-augers, consisting in drawing the pod from a round rod, milling the channel $d$, and the completion of the twist $e$ through the head, and so as to form the spur in rear of the floor-lip $f$, substantially as described.

WILLIAM A. IVES.

Witnesses:
JOHN E. EARLE,
CLARA BROUGHTON.